(12) United States Patent
Sprules et al.

(10) Patent No.: US 6,793,697 B2
(45) Date of Patent: Sep. 21, 2004

(54) COFFEE-SAWDUST-BASED SOLID FUEL COMPOSITION

(76) Inventors: Rodney K. Sprules, 124 Goulburn Avenue, Apt. 2, Ottawa, Ontario (CA), K1N 8E1; Joanne M. Johnson, 124 Goulburn Avenue, Apt. 2, Ottawa, Ontario (CA), K1N 8E1

( * ) Notice: Subject to any disclaimer, the term of this patent is extended or adjusted under 35 U.S.C. 154(b) by 85 days.

(21) Appl. No.: 10/100,984

(22) Filed: Mar. 20, 2002

(65) Prior Publication Data

US 2002/0189159 A1 Dec. 19, 2002

Related U.S. Application Data

(60) Provisional application No. 60/277,627, filed on Mar. 22, 2001.

(51) Int. Cl.$^7$ .................................................. C10L 5/00
(52) U.S. Cl. ............................ 44/535; 44/551; 44/589; 44/590; 44/591
(58) Field of Search ..................... 44/535, 589, 590, 44/551

(56) References Cited

U.S. PATENT DOCUMENTS

| | | | |
|---|---|---|---|
| 4,272,322 A | * | 6/1981 | Kobayashi ..................... 201/6 |
| 4,769,044 A | * | 9/1988 | Cornwell ....................... 44/605 |
| 4,863,488 A | * | 9/1989 | Maeda et al. .................. 44/589 |
| 5,118,539 A | | 6/1992 | Sebby et al. ................... 428/15 |
| 5,868,804 A | | 2/1999 | Williams et al. ............... 44/535 |
| 5,910,454 A | | 6/1999 | Sprules .......................... 44/535 |
| 6,017,373 A | | 1/2000 | Frisch ........................... 44/535 |
| 6,113,662 A | | 9/2000 | Sprules .......................... 44/535 |

FOREIGN PATENT DOCUMENTS

FR            2623815        *    6/1989

\* cited by examiner

Primary Examiner—Cephia D. Toomer
(74) Attorney, Agent, or Firm—Max R. Wood; Ogilvy Renault (57) ABSTRACT

A solid fuel composition of spent coffee grounds and/or green coffee bean waste, sawdust and a wax binder is useful for manufacturing a fire-log with more flame output. This combination of solid particulate together with wax burns with a natural-sounding sizzling and crackling. The fuel composition also develops cracks as it burns, in much the same way as natural wood logs do. The cracks expose more surface area to combustion air, thereby enhancing flame output.

18 Claims, 5 Drawing Sheets

COFFEE-SAWDUST-BASED SOLID FUEL COMPOSITION

CROSS-REFERENCE TO RELATED APPLICATIONS

This application claims the benefit of priority under 35 U.S.C. 119 (a)–(d) to U.S. Application No. 60/277,627, filed Mar. 22, 2001.

MICROFICHE APPENDIX

Not applicable.

TECHNICAL FIELD

The present invention relates to solid fuel compositions, and, in particular, to a solid fuel composition useful for manufacturing an artificial fire-log. The solid fuel composition is made from a combination of a coffee-waste component and sawdust together with a combustible wax binder, to produce better flame output and sounds similar to a natural wood log as it is burned.

BACKGROUND OF THE INVENTION

Manufactured fire-logs are becoming an increasingly popular choice as a fireplace fuel for enjoying a convenient, attractive, cost-effective fire. Typically, manufactured fire-logs provide a consistent flame for a reasonably long period of time, with little effort required to light or maintain the fire. With the rising cost of wood, manufactured fire-logs represent a cost-effective alternative to natural wood fires. Manufactured fire-logs also advantageously consume materials that might otherwise end up in landfill sites.

U.S. Pat. Nos. 5,910,454 and 6,113,662, which issued to the Applicant in 1998 and 2000, respectively, disclose that spent coffee grounds make an ideal fuel component for solid fuel compositions. Spent coffee grounds have a higher calorific value and a higher volatile to fixed carbon ratio than wood. Thus, it has been demonstrated that it is possible to make a fire-log using a major proportion of spent coffee grounds and as little as 35% wax that is equivalent in flame output to that of a fire-log made with sawdust and over 60% wax.

As fire-logs have grown in popularity, consumers have developed an interest in more "natural burning" fire-logs which simulate a natural wood fire. For example, U.S. Pat. Nos. 5,118,539, 5,868,804, and 6,017,373 each teach that by adding seeds and other artificial additives, it is possible to simulate the "crackling sound" of a natural wood fire. U.S. Pat. No. 6,017,373 teaches that inclusion of moist sawdust served to enhance the crackling sound, but was not sufficient to cause it. While fire-logs that incorporate seeds or the like do provide a "popping sound", the sound lacks the "sizzling" sound of wood and the irregularity of the burn and sound pattern of a natural wood fire. Besides, the addition of such seeds, even in relatively small amounts, contributes to the cost of the fire-logs because the seeds are relatively expensive.

Consumers are also demanding fire-logs that provide a higher flame output. Fire-logs on the market today usually contain the maximum wax content that the solid particulate can support. Many also include a coking agent to permit the addition of more wax than the solid particulate alone can support. The coking agent, generally a sugar or molasses additive, coats the fire-log as it burns to retard the evaporation rate of the combustible wax, and to hold the fire-log together. Although effective, coking agents also contribute to the cost of a fire log.

Consequently, there exists a need for an inexpensive manufactured fire-log that has good flame output and also burns with a crackling sound similar to the sound of a natural wood fire.

SUMMARY OF THE INVENTION

It is therefore an object of this invention to provide a fuel composition that provides a maximum safe flame output suitable for combustion in a fireplace without the use of a coking agent.

It is another object of the invention to provide a fuel composition that burns with a sizzling and crackling sound similar to the sound of a natural wood fire.

The invention therefore provides a processed solid fuel composition comprising a combination of spent coffee grounds and/or green coffee bean waste, sawdust and a combustible wax binder. It has been established that spent coffee grounds and/or green coffee bean waste in as little as 1% and as much as 50% by weight of the composition produce an added benefit of improved flame and sound output in a sawdust/wax fire-log. This combination of solid particulate combined with the wax binder provides natural sizzling and crackling when it is burned. The spent coffee grounds and/or green coffee bean waste also promote surface cracking of the solid fuel composition as it combusts. The surface cracking of the solid fuel composition increases surface area exposed to combustion air, and thereby enhances flame output.

It has also been established that high moisture coffee-waste can be added to the fuel composition in effective quantities without noticeably affecting the flame output or reducing the sound output. This permits at least a proportion of the coffee-waste to be used in the condition in which is received from a waste facility. Drying energy and costs are therefore reduced.

For best sound output, the coffee-waste particles are preferably at least about 0.5 mm in diameter. Finer particles can be agglomerated in wax or pelleted to increase particle size before they are incorporated into the solid fuel composition in accordance with the invention.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The invention provides a solid fuel composition useful for manufacturing fire-logs. The solid fuel composition is a mixture of spent coffee grounds and/or green coffee bean waste mixed with sawdust and a flammable wax binder, such as a petroleum or vegetable wax. Fire-logs manufactured using the solid fuel composition provide unique advantages in aesthetic appeal. The fire-logs have higher flame output and combust with natural sizzling and crackling sounds similar to the sound of a natural wood fire.

Fuel Composition

The solid fuel composition in accordance with the invention is manufactured by combining spent coffee grounds and/or green coffee bean waste (hereinafter referred to as a "coffee-waste component") with a wood particulate (hereinafter referred to as "sawdust") and a combustible wax binder. As used in this document, "coffee-waste component" means spent coffee grounds or green coffee bean waste, or any combination of the two in either dried or high moisture form; "sawdust" means any wood-based particulate including, but not limited to, sawdust, planar shavings, wood chips, ground or shredded fiber board, ground or shredded wax board, ground or shredded paper, or the like; and, "combustible wax binder" means any petroleum or vegetable wax that is a solid at temperatures below at least 45° C., and combusts substantially completely when ignited.

The solid fuel composition in accordance with the invention is manufactured in a manner well known in the art by combining a coffee-waste component with sawdust and a combustible wax binder. In an exemplary process, the coffee-waste component is added to a mixing vessel in an amount of between about 1% to about 50% by weight of the total fuel composition. The combustible wax binder in an amount of between about 35% to about 65% by weight of the total fuel composition is melted in a separate vessel. Sawdust, to make up the balance of the fuel composition, is added to the mixing vessel and mixed with the coffee-waste component. Thereafter, the melted combustible wax binder is added while the mixture is stirred to completely disperse the wax. The mixing vessel may be heated while the wax is added to prevent the wax from congealing on the sides of the vessel. The fuel composition is then fed into an extruder equipped with a nozzle suitable for extruding fire-logs and the fuel composition is extruded and cut into appropriate lengths for fire-logs.

Cracking and Flame Output

As is well known, natural firewoods tend to develop longitudinal and radial cracks in their surfaces as they combust. The cracks that develop provide channels for the intrusion of combustion air. This causes high flame output, and yields a bright and cheery fire.

Experimentation has shown that when a coffee-waste component is added to a sawdust/wax mixture to provide a solid fuel composition, surface cracks develop in combusting fire-logs manufactured from the solid fuel composition. The surface cracks are similar to the surface cracks that develop in combusting natural firewoods. Although this phenomenon is not fully understood, it is assumed that the volatile oils in the coffee-waste component vaporize prior to the combustible wax and form pressure pockets that cause surface cracking of the combusting fire-logs.

To illustrate cracking during combustion, numerous samples were prepared with various combinations of spent coffee grounds, sawdust and wax. These samples were then burned and the flame height was measured until each sample extinguished. The flame height was integrated with respect to time in order to quantify flame output in inch-seconds. In addition, the apparent cracking of the fuel product was observed and recorded. The results are presented in Table 1. To facilitate the interpretation of Table 1, FIGS. 1*a*–*d* graphically illustrate an extent of cracking associated with the respective indexes 1–4.

TABLE 1

| % Coffee | % Wax | % Sawdust | Inch-sec | Cracking |
|---|---|---|---|---|
| Section 1: Samples with spent coffee grounds and combustible wax | | | | |
| 0.650 | 0.35 | 0.000 | 2825 | 4 |
| 0.600 | 0.40 | 0.000 | 2902 | 3 |
| 0.550 | 0.45 | 0.000 | 3023 | 2 |
| 0.500 | 0.50 | 0.000 | 2914 | 2 |
| Section 2: Samples with spent coffee grounds, sawdust and combustible wax | | | | |
| 0.325 | 0.35 | 0.325 | 2501 | 4 |
| 0.200 | 0.40 | 0.400 | 2348 | 3 |
| 0.300 | 0.40 | 0.300 | 2579 | 3 |
| 0.400 | 0.40 | 0.200 | 2828 | 2 |
| 0.450 | 0.40 | 0.150 | 2902 | 2 |
| 0.275 | 0.45 | 0.275 | 2756 | 3 |
| 0.250 | 0.50 | 0.250 | 3219 | 3 |
| 0.150 | 0.55 | 0.300 | 2722 | 1 |
| 0.225 | 0.55 | 0.225 | 3319 | 3 |
| 0.300 | 0.55 | 0.150 | 3259 | 1 |
| 0.100 | 0.60 | 0.300 | 2719 | 2 |
| 0.150 | 0.60 | 0.250 | 2813 | 2 |
| 0.200 | 0.60 | 0.200 | 3323 | 2 |
| 0.120 | 0.64 | 0.240 | 2789 | 1 |
| 0.240 | 0.64 | 0.120 | 3246 | 1 |
| 0.175 | 0.65 | 0.175 | 3452 | 2 |
| 0.150 | 0.70 | 0.150 | 3591 | 3 |
| 0.125 | 0.75 | 0.125 | 3849 | 2 |
| Section 3: Samples with sawdust and combustible wax | | | | |
| 0.000 | 0.35 | 0.650 | 1944 | 1 |
| 0.000 | 0.40 | 0.600 | 1937 | 0 |
| 0.000 | 0.45 | 0.550 | 2091 | 0 |
| 0.000 | 0.50 | 0.500 | 2189 | 0 |
| 0.000 | 0.55 | 0.450 | 2262 | 0 |
| 0.000 | 0.60 | 0.400 | 2341 | 0 |
| 0.000 | 0.65 | 0.350 | 2518 | 0 |

TABLE 1-continued

| % Coffee | % Wax | % Sawdust | Inch-sec | Cracking |
|---|---|---|---|---|
| 0.000 | 0.70 | 0.300 | 2620 | 0 |
| 0.000 | 0.75 | 0.250 | 2685 | 0 |

0 = none, 4 = extensive

The results shown in Table 1 indicate several findings with respect to cracking and flame output.

Cracking in the sawdust-wax samples was only observed at the lowest concentration of wax (35% by weight) and the highest concentrations of sawdust (65% by weight). While cracking occurred, the flame output was low because of the low energy content of the sawdust component. On the other hand, cracking was observed in all combinations that included the coffee-waste component. As a result of this phenomenon, for any given wax content, the coffee-waste additive promoted more surface cracks when the fuel was combusted, and thus more oxidation and flame output resulted than was observed for the sawdust-wax mixtures.

The wax content of a pure coffee-waste/wax mixture could not be increased beyond 50% due to excessive dripping of the wax during combustion.

Combining the coffee-waste component and sawdust together with the wax preserves the surface cracking properties associated with the coffee-waste component, and the absorptive properties of the sawdust, thereby enabling a higher flame output to be achieved than can be achieved with a mixture including only one of the two types of solid particulate.

In one embodiment in accordance with the invention, a relatively low wax content (by industry standards) can still be achieved, but with an increase in overall flame output by using between 35% and 45% spent coffee grounds, between 40% and 50% wax, and the remainder sawdust.

In a second embodiment in accordance with the invention, the highest flame output can be achieved by using between 15% and 35% spent coffee grounds, between 50% and 65% wax, and the remainder sawdust.

In a third embodiment in accordance with the invention just 10% to 15% coffee can be seen to significantly increase flame output at wax concentrations between 55% and 65%, where the remainder is sawdust.

Sound Output

In addition to high flame output, natural wood fires burn with a sizzling and crackling sound that provides a pleasant background noise, which enhances the enjoyment of the fire. It is well known that most prior art artificial fire-logs burn with substantially no sizzling or crackling sounds. Experimentation has shown, however, that fire-logs manufactured using the solid fuel composition in accordance with the invention combust with sizzling and crackling sounds that tend to simulate a natural wood fire.

A further advantage of the fuel composition in accordance with the invention is that the coffee-waste component of spent coffee grounds and/or green coffee bean waste typically contains 55% to 80% moisture when received from a coffee plant or a coffee shop. In a fuel product that includes only a coffee-waste component and wax, the coffee-waste component must be dried in order to generate an efficient burn and absorb a desirable quantity of wax. However, when the coffee-waste component constitutes only part of the total solid particulate in a fuel composition, less drying of the coffee-waste component is required, thereby saving drying costs. Furthermore, preservation of the moisture content in the spent coffee-waste component/sawdust/wax mixture serves to intensify the crackling and the sizzling sound output during combustion.

In order to demonstrate the sound output of the solid fuel composition in accordance with the invention, numerous samples were tested using as little as 1% spent coffee grounds by weight and as much as 50% spent coffee grounds by weight, with moisture contents ranging between 15% and 80%. While crackling sounds were observed in all cases, the higher the percentage of coffee grounds, the more intense the sizzling and crackling sounds during combustion.

Table 2 lists the test results obtained from burning 10 gram samples of fuel compositions made in accordance with the invention, as well as fuel samples made in acccordance with the prior art.

TABLE 2

| Sample # | Description | % Sawdust | % Wax | % Sound Additive | # of Audible Sounds |
|---|---|---|---|---|---|
| 1 | Sawdust & wax only | 55% | 45% | 0% | 2 |
| 2 | dry coffee additive | 54% | 45% | 1% | 15 |
| 3 | dry coffee additive | 49% | 45% | 6% | 29 |
| 4 | dry coffee additive | 45% | 45% | 10% | 37 |
| 5 | dry coffee additive | 35% | 45% | 20% | 44 |
| 6 | dry coffee additive | 25% | 45% | 30% | 51 |
| 7 | dry coffee additive | 15% | 45% | 40% | 54 |
| 8 | dry coffee additive | 5% | 45% | 50% | 56 |
| 9 | yellow mustard seeds | 49% | 45% | 6% | 10 |
| 10 | cumin seeds | 49% | 45% | 6% | 96 |
| 11 | flax seeds | 49% | 45% | 6% | 18 |
| 12 | coriander seeds | 49% | 45% | 6% | 28 |
| 13 | coffee particles over 0.5 mm only | 49% | 45% | 6% | 37 |
| 14 | agglomerated dry coffee with 4% wax first | 49% | 45% | 6% | 26 |
| 15 | green coffee beans (waste from roasting plant) | 49% | 45% | 6% | 27 |
| 16 | wet coffee grounds 20% moisture | 49% | 45% | 6% | 22 |
| 17 | wet coffee grounds 40% moisture | 49% | 45% | 6% | 16 |
| 18 | wet coffee grounds 60% moisture | 49% | 45% | 6% | 17 |
| 19 | wet coffee grounds 80% moisture | 49% | 45% | 6% | 13 |

In order to further illustrate the sound output during the combustion of some of the samples shown in Table 2, the sound was recorded and graphical plots were created from the recordings. FIGS. 2–13 show the graphical illustrations of the sound output of the selected samples.

Figure 1A:
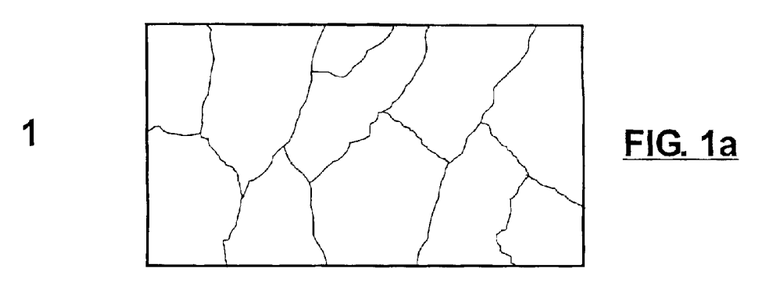
FIGS. 1a–1d are schematic diagrams illustrating various degrees of surface cracking that occurs when artificial fire-logs in accordance with the invention are burned.
Figure 1B:
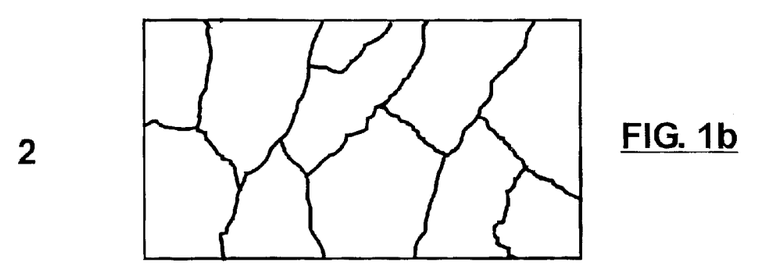
Figure 1C:
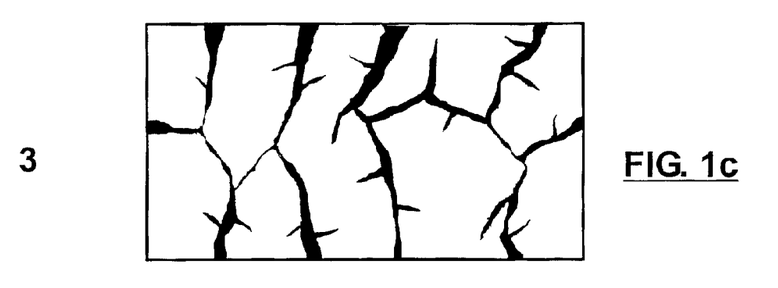
Figure 1D:
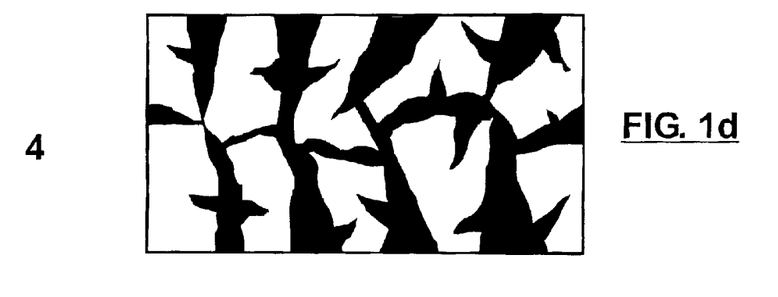
Figure 2:
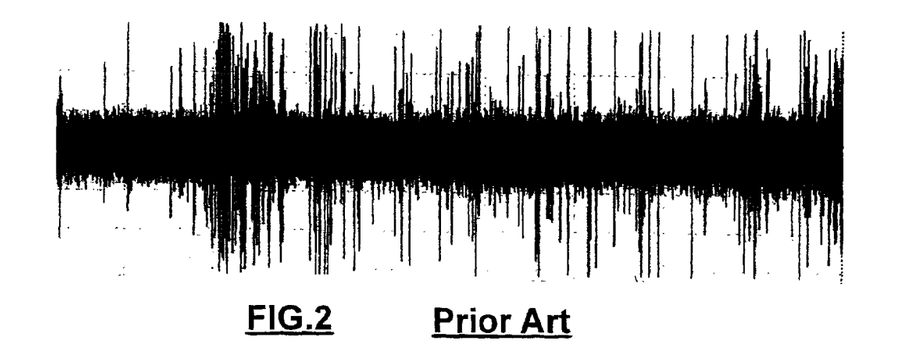
FIG. 2 is a graphical illustration of sound recorded during the combustion of a 10 gram sample of natural wood.

FIG. 2 is a graphical illustration of sound recorded during the combustion of a 10 gram sample of sugar maple, a high energy, premium firewood. As can be seen, the natural wood burns with a consistent output of sizzling and crackling sounds.

Figure 3:
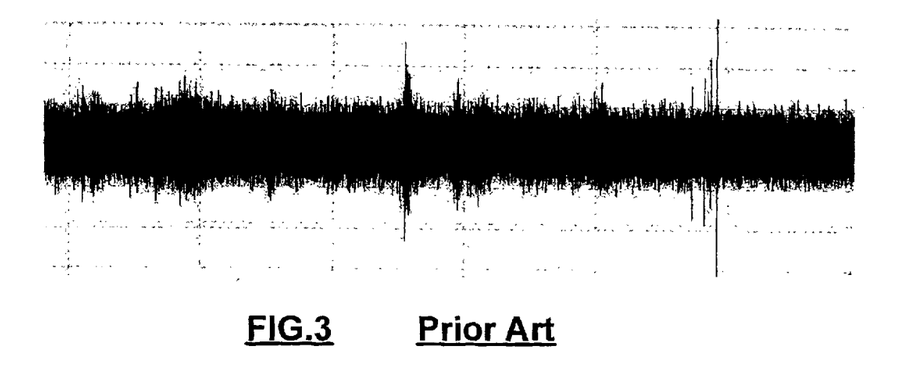
FIG. 3 is a graphical illustration of sound recorded during the combustion of a 10 gram sample of sawdust and wax.

FIG. 3 is a graphical illustration of sound recorded during the combustion of a 10 gram sample of sawdust and wax (sample 2 from Table 2), a typical prior art fire-log composition. Although two audible sounds were observed as the sample burned, there was no noticeable sizzling and crackling.

Figure 4:
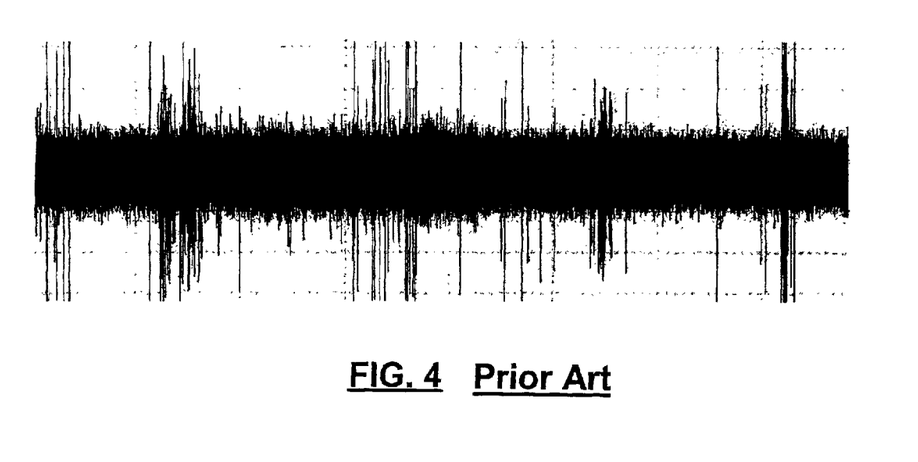
FIG. 4 is a graphical illustration of sound recorded during the combustion of a 10 gram sample of sawdust, wax and mustard seed.

FIG. 4 is a graphical illustration of sound recorded during the combustion of a 10 gram sample of sawdust, wax and 6% mustard seed (sample 9 from Table 2), a prior art fuel composition for enhancing sound output. Although sound output was increased relative to the sawdust/wax mixture shown in FIG. 3, the increase in sound output was less than that produced by a spent coffee grounds/sawdust/wax mixture containing only 1% by weight of dry spent coffee grounds.

Figure 5:
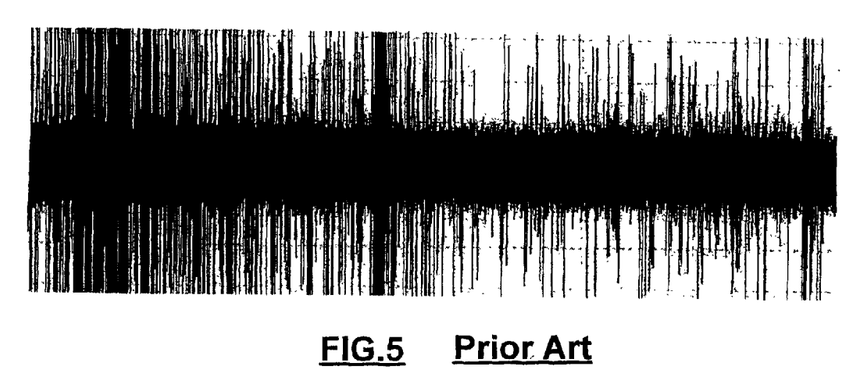
FIG. 5 is a graphical illustration of sound recorded during the combustion of a 10 gram sample of sawdust, wax and cumin seed.

FIG. 5 is a graphical illustration of sound recorded during the combustion of a 10 gram sample of sawdust, wax and 6% cumin seeds (sample 10 from Table 2), another prior art fuel composition for enhancing sound output. Cumin seeds, while prohibitively expensive, output the most sound of any of the samples tested. In fact, the sound output was significantly greater than the natural wood fire (see FIG. 2)

Figure 6:
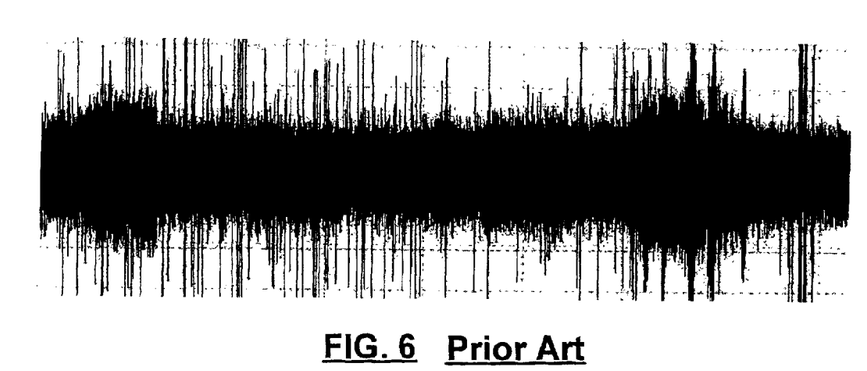
FIG. 6 is a graphical illustration of sound recorded during the combustion of a 10 gram sample of sawdust, wax and coriander seeds.

FIG. 6 is a graphical illustration of sound recorded during the combustion of a 10 gram sample of sawdust, wax and coriander seeds (sample 12 from Table 2), another prior art fuel composition for enhancing sound output. Coriander seeds, while considerably less expensive than Cumin seeds, are still quite expensive when compared to coffee waste. The coriander seeds output more low level noise than the natural wood but otherwise approximated the sound of the natural wood fire.

Figure 7:
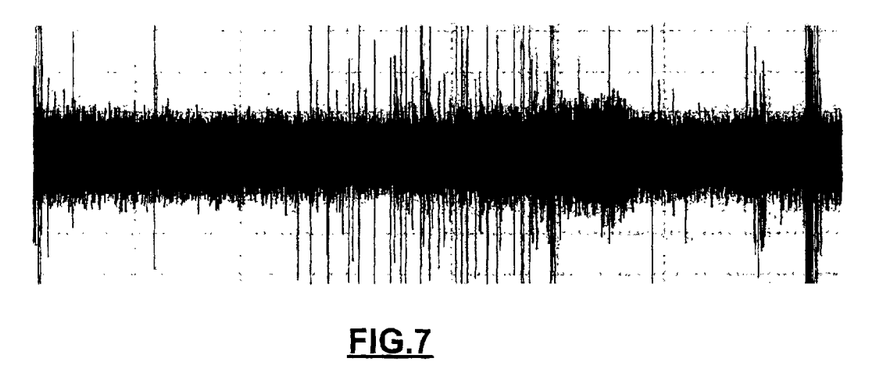
FIG. 7 is a graphical illustration of sound recorded during the combustion of a 10 gram sample of sawdust, wax and 1% dry spent coffee grounds.

FIG. 7 is a graphical illustration of sound recorded during the combustion of a 10 gram sample of sawdust, wax and 1% dry spent coffee grounds (sample 2 from Table 2). While it can be seen that the sound output is less than that of the natural fire shown in FIG. 2, the increase in sound output over the prior art sawdust/wax sample shown in FIG. 3 is quite dramatic considering that the sample contained only 1% by weight of dry spent coffee grounds.

Figure 8:
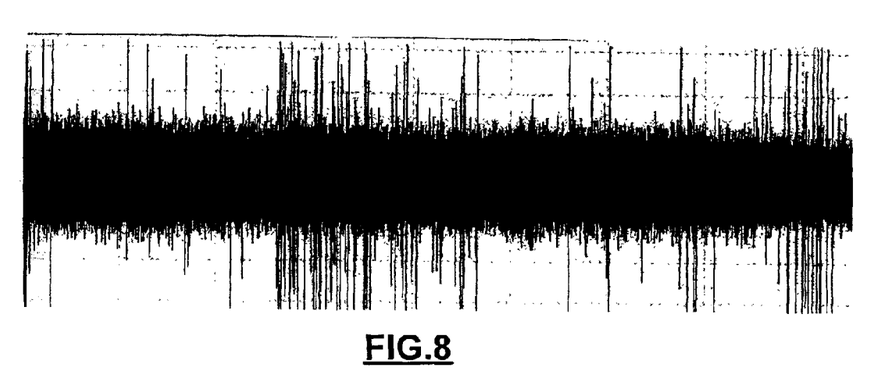
FIG. 8 is a graphical illustration of sound recorded during the combustion of a 10 gram sample of sawdust, wax and 6% dry spent coffee grounds.

FIG. 8 is a graphical illustration of sound recorded during the combustion of a 10 gram sample of sawdust, wax and 6% by weight of dry spent coffee grounds (sample 3 from Table 2). The improvement in sound output is evident, and while the 6% by weight of dry spent coffee grounds does not quite equal the natural fire in sound output, the sound output is significant.

Figure 9:
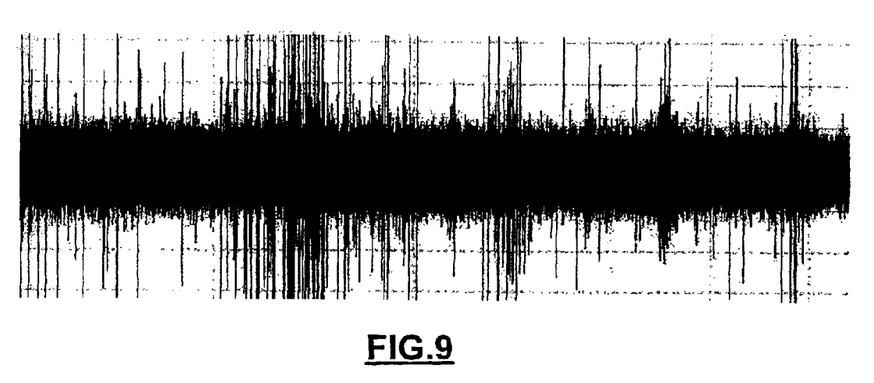
FIG. 9 is a graphical illustration of sound recorded during the combustion of a 10 gram sample of sawdust, wax and 10% dry spent coffee grounds.

FIG. 9 is a graphical illustration of sound recorded during the combustion of a 10 gram sample of sawdust, wax and 10% dry spent coffee grounds (sample 4 from Table 2). As seen, the increase in the concentration of the coffee-waste component results in a corresponding increase in the audible sound output.

Figure 10:
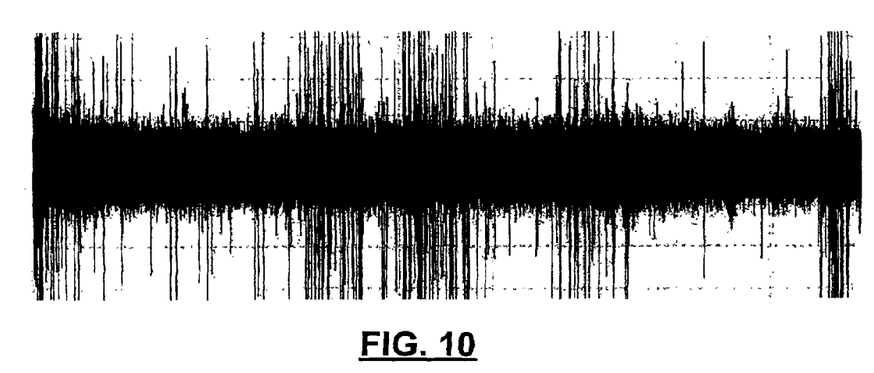
FIG. 10 is a graphical illustration of sound recorded during the combustion of a 10 gram sample of sawdust, wax and 40% dry spent coffee grounds.

FIG. 10 is a graphical illustration of sound recorded during the combustion of a 10 gram sample of sawdust, wax and 40% dry spent coffee grounds (sample 7 from Table 2). The sound output is not significantly increased over the 10% by weight sample shown in FIG. 9, but there is an incremental increase, and a natural sounding fire results.

Figure 11:
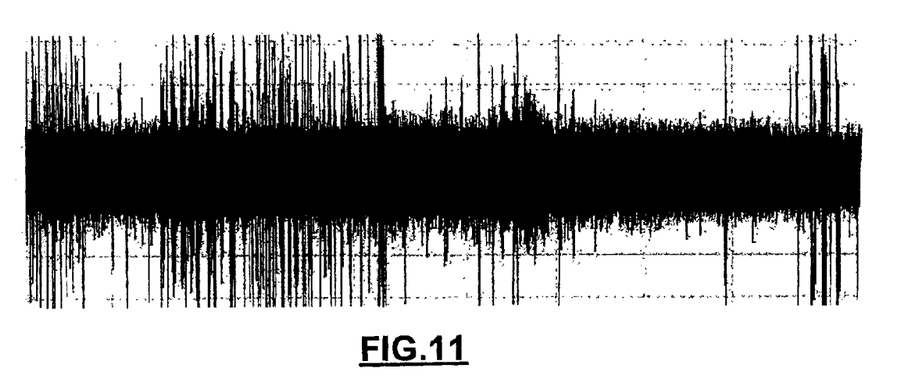
FIG. 11 is a graphical illustration of sound recorded during the combustion of a 10 gram sample of sawdust, wax and 6% dry spent coffee grounds having a particle size of over 0.5 mm.

FIG. 11 is a graphical illustration of sound recorded during the combustion of a 10 gram sample of sawdust, wax and 6% dry spent coffee grounds having a particle size of over 0.5 mm (sample 13 from Table 2). As is evident, this sample demonstrates that particle size is important, and larger coffee-waste particles produced more audible sound that finely ground coffee waste. In terms of sound production, it is therefore desirable to add a higher concentration of larger coffee particles to the fuel composition. High-moisture coffee grounds may also be pelletized to achieve the same effect. If pelletized, the coffee is compressed under enough pressure to form cohesive grains that will not disintegrate during mixing with the sawdust and the wax to form the fire-log. The compression is adjusted to achieve the required cohesion without expelling too much of the moisture content of the spent coffee grounds.

Figure 12:
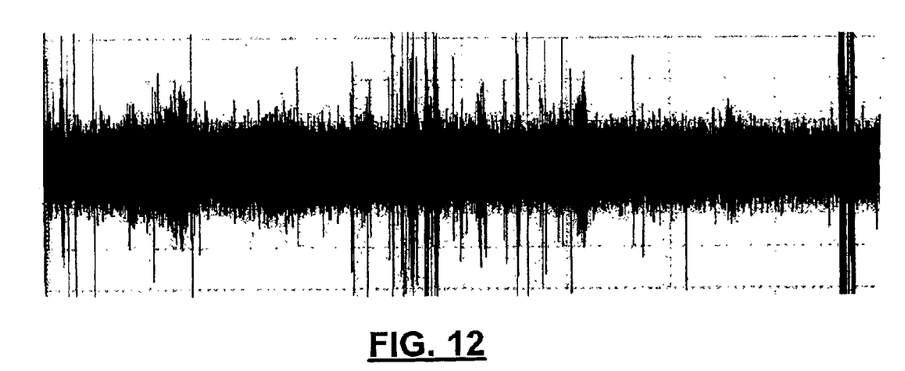
FIG. 12 is a graphical illustration of sound recorded during the combustion of a 10 gram sample of sawdust, wax and 6% dry spent coffee grounds agglomerated with 4% wax.

FIG. 12 is a graphical illustration of sound recorded during the combustion of a 10 grain sample of sawdust, wax and 6% dry spent coffee grounds agglomerated with 4% wax (sample 14 from Table 2). As seen, the agglomeration tends to have an effect similar to the addition of larger coffee particles to the fuel composition. Hence, a further embodiment of the fuel composition in accordance with the invention is made by mixing spent coffee grounds, preferably having a moisture content ranging from 15% to 80% to increase sound output and reduce drying costs. In this embodiment spent coffee grounds may constitute as little as 6%–10% by weight of the solid fuel composition, and up to as much as 50% by weight of the solid fuel composition, with wax constituting between 40% and 65% by weight of the solid fuel composition, the remainder being sawdust. The coffee-waste component is first encapsulated in liquid combustible wax cooled to just above the congealing point of the wax, before it is mixed with the sawdust. After the encapsulated coffee-waste component and the sawdust are thoroughly mixed, a balance of the molten wax is added while stirring, as described above.

Figure 13:
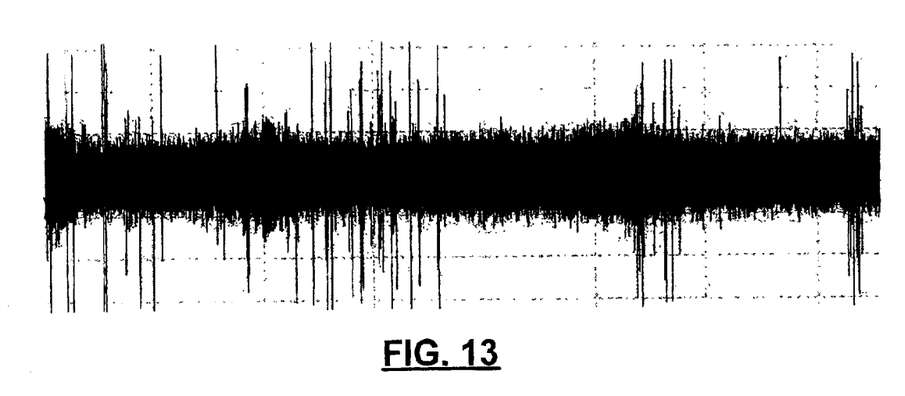
FIG. 13 is a graphical illustration of sound recorded during the combustion of a 10 gram sample of sawdust, wax and 6% green coffee bean waste.

FIG. 13 is a graphical illustration of sound recorded during the combustion of a 10 gram sample of sawdust, wax and 6% green coffee bean waste (sample 15 from Table 2). The green coffee bean waste tends to produce more sizzling and less crackling than the dried spent coffee grounds, but it still significantly enhances sound output, causes surface cracking to enhance flame output, and contributes more energy to the fuel composition than the sawdust component.

It should also be noted that the wax component added to the fuel composition in accordance with the invention can be reduced by replacing all or part of the sawdust component with ground wax board, which is currently disposed of in landfill sites. The reduction in combustible wax is directly proportional to the wax content of the wax board. Sources of wax boards include waste milk and drink cartons, fruit and vegetable boxes, and the like.

The invention therefore provides a solid fuel composition in which inexpensive waste products are combined with a combustible wax to produce an artificial fire log with improved flame and sound output. The sound during combustion is comparable to a natural wood fire. Since coffee waste and sawdust, both of which are currently composted or dumped in landfill sites, are utilized as major components of the solid fuel composition, the pressure on waste disposal facilities is reduced. Consequently, the solid fuel composition in accordance with the invention not only provides a cheery, pleasant fire that is soothing to listen to, it also promotes the re-use of waste products that are frequently disposed of in dump sites.

The embodiment(s) of the invention described above is(are) intended to be exemplary only. The scope of the invention is therefore intended to be limited solely by the scope of the appended claims.

We claim:

1. A solid fuel composition useful for manufacturing an artificial fire-log that produces sizzling and crackling sounds and develops cracks when combusted, the cracks increasing flame output of the fire-log, the fuel composition consisting of at least 1% and at most about 45% by weight of a coffee-waste component, at least 10% and at most about 50% by weight sawdust, and at least 30% and at most about 65% by weight of a combustible wax.

2. A fuel composition as claimed in claim 1 wherein a moisture content of the coffee-waste component is from about 15% to about 80% by weight.

3. A solid fuel composition as claimed in claim 1 wherein at least about 50% by weight of the coffee-waste component has a particle size of at least 0.5 mm.

4. A solid fuel composition useful for manufacturing an artificial fire-log that produces sizzling and crackling sounds and develops cracks when combusted, the cracks increasing flame output of the fire-log, the solid fuel composition consisting of about 35% to about 45% by weight of a coffee-waste component, about 40% to about 50% by weight of wax, and the balance sawdust.

5. A fuel composition as claimed in claim 4 wherein a moisture content of the coffee-waste component is from about 15% to about 80% by weight.

6. A solid fuel composition as claimed in claim 4 wherein at least about 50% by weight of the coffee-waste component have a particle size of at least 0.5 mm.

7. A high flame output fire-log that produces sizzling and crackling sounds when combusted, the fire-log consisting of about 15% to about 35% by weight of a coffee-waste component, about 50% to about 65% by weight of wax, and the balance sawdust.

8. A fire-log as claimed in claim 7 wherein a moisture content of the coffee-waste component is from about 15% to about 80% by weight.

9. A fire-log as claimed in claim 8 wherein at least about 5% and at most about 20% by weight of combustible solids are high moisture coffee-waste component encapsulated in wax by mixing the high moisture coffee-waste component with molten wax that has been cooled to just above a congealing point of the wax, prior to being mixed with other components of the solid fuel composition.

10. A solid fuel composition as claimed in claim 7 wherein at least about 50% by weight of the coffee-waste component have a particle size of at least 0.5 mm.

11. A fire-log, as claimed in claim 7 wherein at least about 5% and at most about 20% by weight of combustible solids are a high moisture coffee-waste component that has been pelletized by compression adequate to form cohesive grains without expelling a significant amount of the moisture content of the coffee-waste component.

12. A fire-log, as claimed in claim 7 wherein at least about 5% by weight of combustible solids are a high moisture coffee-waste component that has been pelletized by compression adequate to form cohesive grains without expelling a significant amount of the moisture content of the coffee-waste component.

13. A solid fuel composition useful for manufacturing an artificial fire-log that produces sizzling and crackling sounds and develops cracks when combusted, the cracks increasing flame output of the fire-log, the fuel composition consisting of about 1% to about 15% by weight of a coffee-waste component, about 55% to about 65% by weight of combustible wax binder, and the balance sawdust.

14. A solid fuel composition as claimed in claim 13 wherein at least about 1% and at most about 15% by weight of combustible solids are a high moisture coffee-waste component encapsulated in wax by mixing the high moisture coffee-waste component with molten wax that has been cooled to just above the congealing point of the wax, prior to being mixed with other components of the solid fuel composition.

15. A solid fuel composition as claimed in claim 13 wherein a moisture content of the coffee-waste component is from about 15% to about 80% by weight.

16. A solid fuel composition as claimed in claim 13 wherein at least about 50% by weight of the coffee-waste component have a particle size of at least 0.5 mm.

17. A solid fuel composition as claimed in claim 2 wherein at least about 5% and at most about 20% by weight of combustible solids are high moisture coffee-waste component encapsulated in wax by mixing the high moisture coffee-waste component with molten wax that has been cooled to just above a congealing point of the wax, prior to being mixed with other components of the solid fuel composition.

18. A solid fuel composition as claimed in claim 13 wherein at least about 1% and at most about 15% by weight of combustible solids are a high moisture coffee-waste component that have been pelletized by compression adequate to form cohesive pellets without expelling a significant amount of the moisture content of the coffee-waste component.

* * * * *